Nov. 22, 1927.
C. W. METZGER
MILLING CUTTER
Filed Nov. 22, 1923
1,650,290
2 Sheets-Sheet 2
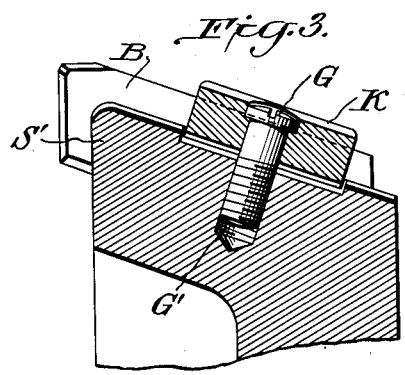
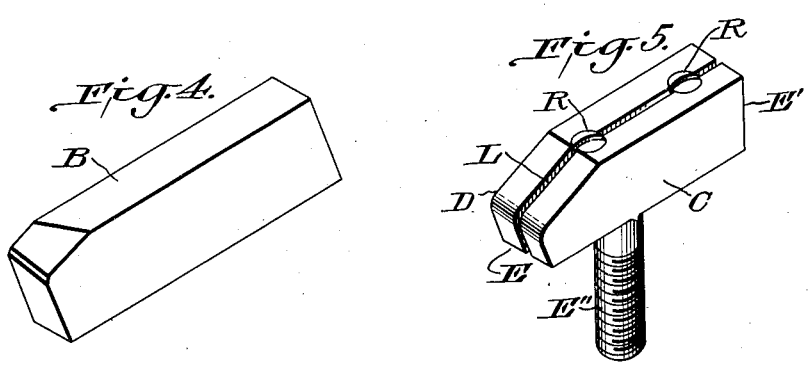
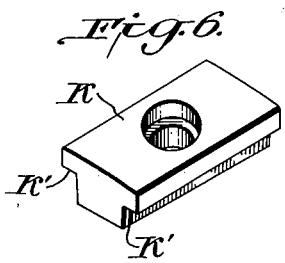
Inventor:
Claude W. Metzger,
By Byrnes Townsend & Brickenstein
Attorneys.

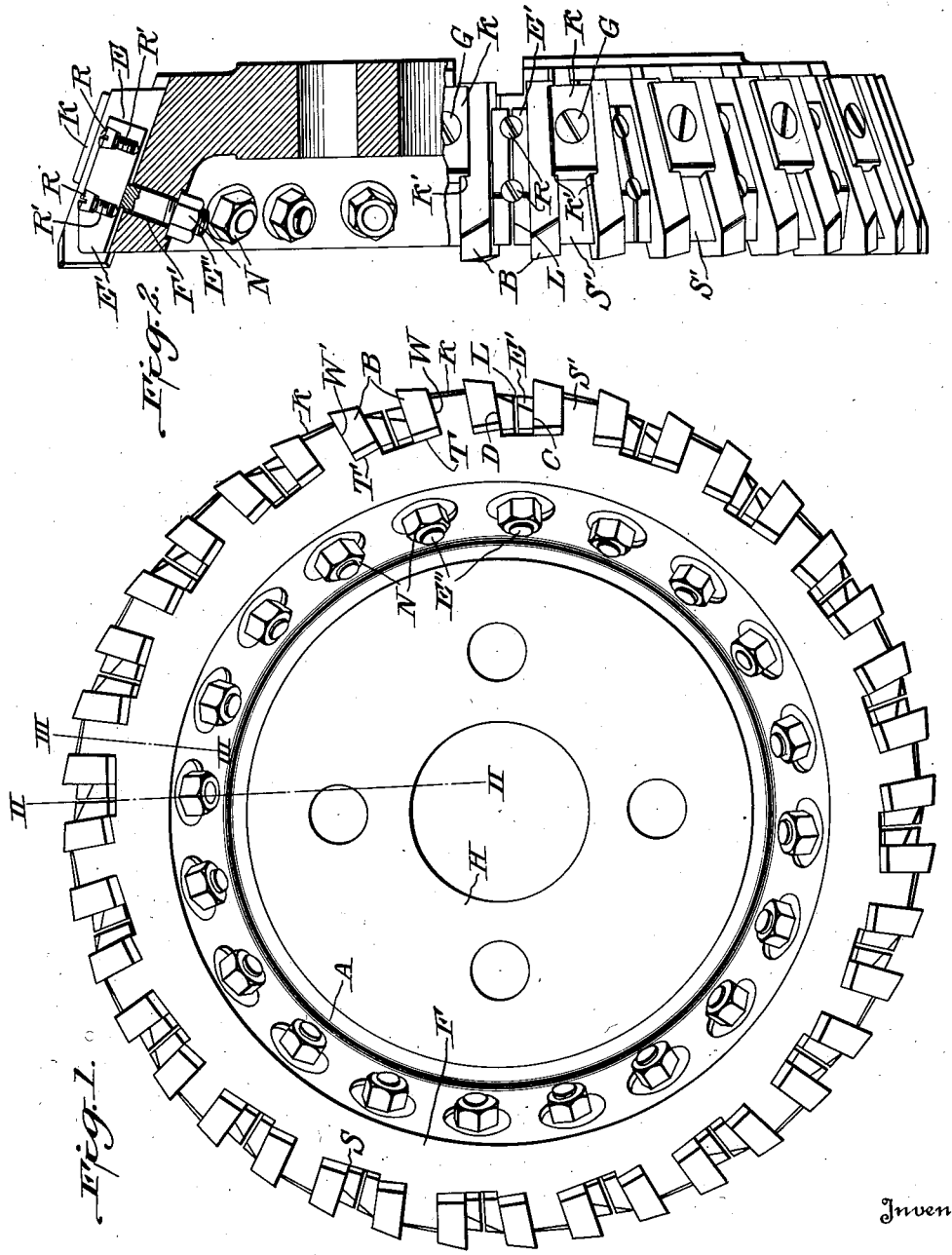

Patented Nov. 22, 1927.

1,650,290

UNITED STATES PATENT OFFICE.

CLAUDE W. METZGER, OF LOS ANGELES, CALIFORNIA, ASSIGNOR, BY MESNE ASSIGNMENTS, TO CONSOLIDATED MACHINE TOOL CORPORATION OF AMERICA, A CORPORATION OF DELAWARE.

MILLING CUTTER.

Application filed November 22, 1923. Serial No. 676,384.

This invention relates to milling cutter bodies or heads having inserted teeth assembled around the periphery thereof.

Because of their distinct economy over solid milling cutters in many classes of work, inserted-teeth cutter bodies are now in general use, but considerable trouble is experienced with them when removing metal at extraordinary speeds with high speed cutting metal, such as stellite, due to the resultant hammer blows on the cutting edges and the unusual shock that the blades, cutter body and holding apparatus must withstand. In such service, it is impossible to maintain the accuracy of the blade-receiving slots, the face and the arbor-receiving hole in a soft steel blade-supporting body, and cutter bodies have therefore been constructed with all parts of hardened steel. However, when bodies having hardened slots are employed, greater accuracy and expense are required to obtain a perfect fit between the slots and blades and many blades are broken or damaged when they are being fitted or adjusted in the head.

One of the objects of this invention is to provide a cutter body or head and blade-clamping means whereby inserted blades of high speed cutting metal, such as stellite, may be held practically as rigidly as in a solid cutter without requiring extremely accurate machining of the blades and the slots that receive them, thereby substantially eliminating breakage of blades in fitting and adjusting them in the head.

Another object is to provide a cutter body upon which a greater number of blades can be assembled for a given diameter, making it possible to pass a greater number of cutting blades per minute across the work without increasing the periphery speed of the cutter.

Broadly speaking, the improved cutter head of this invention comprises a hardened steel body having transverse slots in its periphery providing seats for pairs of blades of high speed cutting metal which are rigidly secured to the body by clamping means holding such blades against their seats and by means designed to wedge the blades against the side walls of said slots.

The objects and novel features of this invention will be apparent from the following description taken with the accompanying drawings, in which Fig. 1 is a face view of a milling cutter embodying this invention;

Fig. 2 is a side view of the same, partly in section on the line II—II of Fig. 1;

Fig. 3 is a sectional view taken on the line III—III of Fig. 1;

Fig. 4 is a perspective view of a type of inserted cutter blade;

Fig. 5 is a perspective view of an improved wedge bolt and lock screws for holding a pair of blades in place; and Fig. 6 is a perspective view of a clamp plate for holding a pair of blades down upon their seats.

Referring to the drawings, the hardened supporting body A of the improved milling cutter may consist of a hub H adapted to be rigidly secured to a rotatable shaft of a milling machine. The outer periphery of an integral flange F on the hub has a series of transverse slots S formed therein which provide spaced substantially parallel walls W and W' and adjoining seats or faces T and T' between such walls inclined rearwardly toward the axis of the body A. The seats T, T' are thus arranged in pairs about the periphery of the supporting body, and each slot is designed to accommodate a pair of blades B of high speed cutting metal, such as stellite, on the seats thereof. These blades are substantially rectangular, as shown in Fig. 4, and bear upon their seats along their narrow edges and over-hang that face and periphery of the cutter body which is of the larger diameter, as illustrated in Figs. 1, 2 and 3. Suitable interlocking means may be provided between the edges of the blades and the flange F to prevent slippage of the blades lengthwise of their seats and to also provide a gauge for the accurate extension of the blades when adjustment is required because of wear or removal of metal in sharpening them from the cutting end.

The pairs of blades are severally held in place on the supporting flange F by improved clamping means holding them firmly against the walls W, W' and down upon their seats T, T'. A clamping device is associated with each pair of blades and comprises an equalizing wedge bolt E that may be rigidly secured to the supporting flange, as shown in Figs. 1, 2 and 5. Each bolt has a wedge head E' that fits between a pair of blades in a slot S, and a threaded shank E″ that projects through a hole F′ in the flange F and is secured to the latter at its inner end by suitable means, such as a nut N.

The wedge head E′ is elongated and designed to frictionally engage the opposed faces of a pair of blades. In order that the wedging pressure shall be uniformly distributed over the entire surfaces of the blades engaged thereby, the head E′ is provided with a longitudinal slit or saw-cut L which divides it lengthwise into two relatively adjustable sections, each being united integrally to the shank E″. The bolt is made of a suitable grade of steel that may be given a spring temper so that the two sections of the head may yield relatively to one another to automatically adjust themselves to slight variations in their dimensions and especially to variations in the dimensions of the slots and blades to thereby compensate for any inaccuracies due to grinding of blades, cutting of slots or wear of blades and slots. The heads of the wedge bolts are therefore individually self-adjusting and thereby independently equalize the clamping or wedging action against each pair of blades to provide a substantially perfect bearing at all points between the blades, slots and bolt heads before the latter are finally tightened by the nuts N.

To further augment the proper wedging action of the bolt, threaded sockets R′ may be provided near the opposite ends of the slit L to receive lock screws R having tapering heads which engage correspondingly tapering portions of the sockets R′. Tightening these lock screws slightly spreads the sections of the head at either or both ends thereof to take up any further adjustment necessary to obtain complete and uniform contact between the bolt head and the abutting blade faces. The provision of two lock screws prevents any further pivotal movement of either section after the wedge has conformed to the shape of the space between the blades. The shape of the wedge head E′ may be varied, but is desirably as shown in Fig. 5, one face C being substantially parallel to the axis of the bolt shank and the opposite longitudinal face D being slightly inclined to said axis in two directions, making the head increasingly wider toward its rear end.

Additional clamping means may be advantageously employed to firmly hold the blades against their seats T, T′. As shown in Figs. 1, 3 and 6, clamp plates K are provided which have parallel longitudinal lips K′ adapted to hook over the outer longitudinal edges of pairs of blades which abut against walls on opposite sides of the transverse ridges S′ constituting the partitions between the slots S. Each clamp plate K holds down a pair of blades and is secured to the supporting body by a screw G that fits in a threaded socket G′ in the ridge S′ against which such blades abut.

The pairs of blades are assembled on the supporting body by first inserting a pair of blades in a slot S and fitting a wedge bolt head between them, securing the latter preliminarily by screwing the nut N up on the bolt shank E″. Because the sections of the wedge head are relatively yieldable, the thickness of the head automatically adjusts itself to take up variations in the space between the blades as the bolt is drawn into place. Thereupon, the wedge screws R are screwed tightly into their sockets, and then the nut N may be given another partial turn or so to increase the wedging action and further equalize the pressures against the blades at all points. Finally, when all the blades have been wedged in their slots, the outer clamps K may be properly secured in place as a factor of safety for holding the blades firmly against their seats at the bottoms of the slots.

The simplicity and efficiency of the improved blade clamping means will be apparent from the foregoing description. Any blade may be readily removed or replaced. The split wedging head of the wedge bolt is an important feature, since it provides means for equalizing the clamping pressures on the blades so that breakage thereof in use, or in adjusting or replacing them is practically eliminated. Moreover, the narrow space required for the wedge head of the improved clamping means affords a decided advantage over prior milling cutters, in that a greater number of cutting blades may be assembled on a head of a given diameter.

I claim:

1. A milling cutter comprising a supporting body having seats thereon, cutting blades fitting said seats, and means securing said blades to said body, such securing means including bolts having heads divided into sections which are relatively adjustable to take up variations in the dimensions of said blades and seats.

2. A milling cutter comprising a supporting body having parallel transverse seats thereon, elongated cutting blades fitting said seats, and means securing said blades to said body including bolts having elongated heads divided longitudinally into sections which are relatively adjustable to take up variations in the dimensions of said blades and seats.

3. A milling cutter comprising a supporting body having pairs of parallel transverse seats thereon, pairs of cutting blades severally fitting said pairs of seats, and means securing such pairs of blades to said body including wedge devices severally cooperating with the pairs of blades, such devices having relatively yieldable sections adapted to take up variations in the dimensions of said seats and blades, and means integral with said sections for securing them to said body.

4. A milling cutter comprising a supporting body having seats thereon, cutting blades fitting said seats, and means independent of said blades for securing said blades to said body, such securing means comprising devices having yieldably connected sections and means for spreading such sections toward said blades, and means integral with said sections for securing them to said body.

5. A milling cutter comprising a supporting body having seats thereon, cutting blades fitting said seats, and means securing said blades to said body, such securing means comprising wedges bearing against said blades and consisting of a base portion having means for engaging the body extending therefrom and sections resiliently secured to said base portion, said sections being separated by a slit and normally biased toward one another, and means engaging in said slit to spread said sections.

6. A milling cutter comprising a supporting body having seats thereon, cutting blades fitting said seats, and means securing said blades to said body, such securing means comprising wedges bearing against said blades and consisting of relatively yieldable sections separated by a slit, and a pair of screws having tapering portions engaging in said slit near the opposite ends thereof adapted to spread said sections, said securing means having an integral portion engaging said body opposite said slit.

7. A milling cutter comprising a supporting body having seats thereon, cutting blades fitting said seats, and means securing said blades to said body comprising wedge means bearing against the sides of said blades and plate means bearing against the outer edges of said blades.

8. A milling cutter comprising a supporting body having transverse seats separated by partitions, cutting blades fitting said seats and bearing against said partitions, and means for securing said blades to said body comprising wedges secured to said body and bearing against said blades, and plates secured to said partitions and bearing against the outer edges of said blades.

9. A milling cutter comprising a supporting head having pairs of seats separated by partitions, pairs of cutting blades fitting said seats and abutting against said partitions, and means securing said blades to said body comprising wedges severally bearing against the opposed sides of the pairs of blades between successive partitions and plates bearing against the outer edges of the pairs of blades abutting against the partitions.

10. A milling cutter comprising a supporting body having transverse slots in its periphery providing seats and partitions separating such seats, cutting blades fitting said seats and abutting against said partitions, and means securing said blades to said body comprising individually adjustable bolts having wedge heads in such slots bearing against the sides of the blades therein, and plates secured to the outer edges of said partitions and bearing against the outer edges of the blades.

In testimony whereof, I affix my signature.

CLAUDE W. METZGER.